(12) United States Patent
Tsujii

(10) Patent No.: US 6,891,923 B2
(45) Date of Patent: May 10, 2005

(54) RADIATION SENSING APPARATUS

(75) Inventor: Osamu Tsujii, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/414,335

(22) Filed: Apr. 15, 2003

(65) Prior Publication Data

US 2003/0194058 A1 Oct. 16, 2003

(30) Foreign Application Priority Data

Apr. 16, 2002 (JP) ........................................ 2002-113633

(51) Int. Cl.$^7$ .............................................. G01N 23/04
(52) U.S. Cl. ........................ 378/62; 378/98.3; 378/98.8
(58) Field of Search ............................ 378/4, 62, 98.3, 378/98.8

(56) References Cited

U.S. PATENT DOCUMENTS 6,516,098 B2    2/2003    Nonaka

FOREIGN PATENT DOCUMENTS

| JP | 56011395 A | 2/1981 |
|---|---|---|
| JP | 55012429 | 3/1981 |
| JP | 11-151233 | 6/1999 |

*Primary Examiner*—David V Bruce
(74) *Attorney, Agent, or Firm*—Morgan & Finnegan, LLP (57) ABSTRACT

A scheme for enabling proper radiation sensing to be performed without establishing a synchronous connection by generating radioscopic and sensing timings of an image sensor, includes a timing prediction unit for predicting an x-ray pulse timing on the basis of a detection value of a first X-ray detection unit, and outputting the predicted radiation pulse timing, and a drive control unit for effecting drive control of a second X-ray detection unit on the basis of an output of the timing prediction unit, thereby making it possible to perform the proper radiation sensing without establishing the wired or wireless online synchronous connection.

12 Claims, 5 Drawing Sheets

RADIATION SENSING APPARATUS

BACKGROUND OF THE INVENTION

1. Field of the Invention

The present invention relates to a radiation sensing technology for sensing a radiation image.

2. Related Background Art

An X-ray imaging apparatus for obtaining a radiation image of an object by irradiating an inspection object with radiation and detecting an intensity distribution of the radiation penetrating the object, has hitherto been widely utilized in the field of industrial non-destructive inspections and in the field of medical diagnoses.

A film/screen method for X-rays is exemplified as a general method for performing the above sensing process. This is a method using a photosensitive film and a fluorescent substance having a sensitivity to the X-rays in combination.

The sensing method given above is that when irradiating the X-rays, the sheet-shaped fluorescent substances of luminous rare earth, which are arranged on both surfaces of the photosensitive film with being in contact therewith, convert the X-rays penetrating the object into visible rays, and the photosensitive film captures the visible rays. Then, a latent image formed on the film can be made visible by developing this latent image by a chemical treatment.

On the other hand, with advancements of digital technologies over the recent years, there has been a demand for a system for obtaining a high quality image of the radiation by converting the radiation image into electric signals, then executing image processing on these electric signal and thereafter reproducing them as a visible image on a CRT, etc. . . As a method of converting the radiation image into the electric signals, there has been proposed a radiation image recording/reproducing system (e.g., Japanese Patent Application Laid-Open Nos. 55-12429 and 56-11395) in which a radiation image is temporarily accumulated as a latent image in the fluorescent substance, and thereafter irradiating it pumping (excited) beams such as laser beams, etc. to photoelectrically read out the latent image and output as a visible image by.

Moreover, with advancements of semiconductor process technologies over the recent years, there has been developed an apparatus that similarly captures the radiation image by use of a semiconductor sensor. These systems have by far a broader dynamic range compared with a radiographic system using a conventional photosensitive film, and has a utilitarian advantage that a radiation image that is not affected by fluctuations in exposure quantity of the radiation can be obtained. In addition, the systems given above do not require, unlike the conventional photosensitive film method, any chemical treatment and has an advantage that an output image can be obtained instantaneously.

Figure 4:
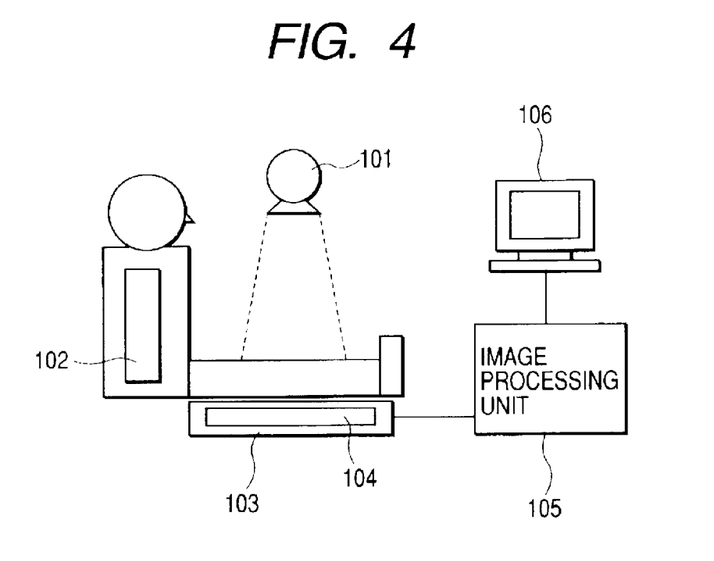
FIG. 4 is a view showing a concept of a system.

FIG. 4 is a conceptual diagram showing one example of the system using the radiation image sensing apparatus described above.

Referring to FIG. 4, the numeral 103 represents an X-ray image sensing apparatus having a built-in X-ray detection sensor 104. An object is irradiated with the X-rays emitted by an X-ray generation device 101, and the X-rays penetrating the object 102 are detected by photoelectric converting elements arranged in two-dimensional matrix form. Image signals outputted from this detection unit undergo digital image processing in an image processing unit 105, and an X-ray image of the object is displayed on a monitor 106.

Conventionally, this type of imaging apparatus has hitherto been installed in a radiation room and thus utilized. In recent years, however, a thin and light-weighted portable sensing (viewing) apparatus (which is also called an electronic cassette) comes to be demanded in order to enable various image capturing to be quickly sensed (viewed).

Figure 3:
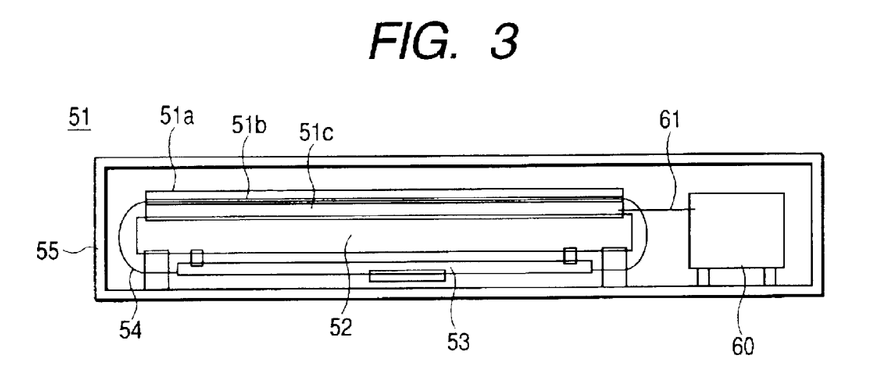
FIG. 3 is an explanatory side sectional view showing an example of a configuration of the electronic cassette.

An outline of the configuration is now explained with reference to a side sectional view in FIG. 3. An electronic cassette 51 utilized for the X-ray imaging process described above is constructed of a fluorescent substance 51a for converting the X-rays into visible rays, photoelectric converting elements 51b arranged two-dimensionally, that serve to convert the visible rays into electric signals, a substrate 51c on which the photoelectric converting elements 51b are formed, a base 52 for supporting this substrate 51c, a circuit board 53 mounted with electronic parts for processing the photoelectrically-converted electric signals, wires 54, a housing body 55 accommodating these components, an electric power source circuit 60 for supplying the electricity to the photoelectric converting elements 51b and to the circuit board 53, and a wire 61 for the power source.

A specific configuration of the power source circuit 60 is attained by using a battery and a DC/DC power source circuit or by supplying a predetermined voltage from outside via a power supply cable (not shown) and generating a variety of voltages in the DC/Dc power source, and so on.

The thin and light-weighted portable sensing apparatus, i.e., the electronic cassette is demanded in order to enable various image capturing to be quickly sensed (viewed), however, it is required that an exposure of the X-rays and a drive timing of the X-ray sensor be synchronized.

A technology related to the synchronous timing is disclosed in Japanese Patent Application Laid-Open No. 11-151233. An explanation in Japanese Patent Application Laid-Open No. 11-151233 is concerned with a radiation sensing apparatus for obtaining an image by irradiating an object with the radiation, which is constructed of a radiation sensing unit composed of two-dimensional sensing elements arranged in a matrix form, at least one or more radiation detection units for detecting a radiation-irradiating state, a radiation irradiation timing judging unit for judging the radiation-irradiating state detected, and a drive control unit for changing an operation state of the radiation sensing unit on the basis of the judgement made above.

Figure 5:
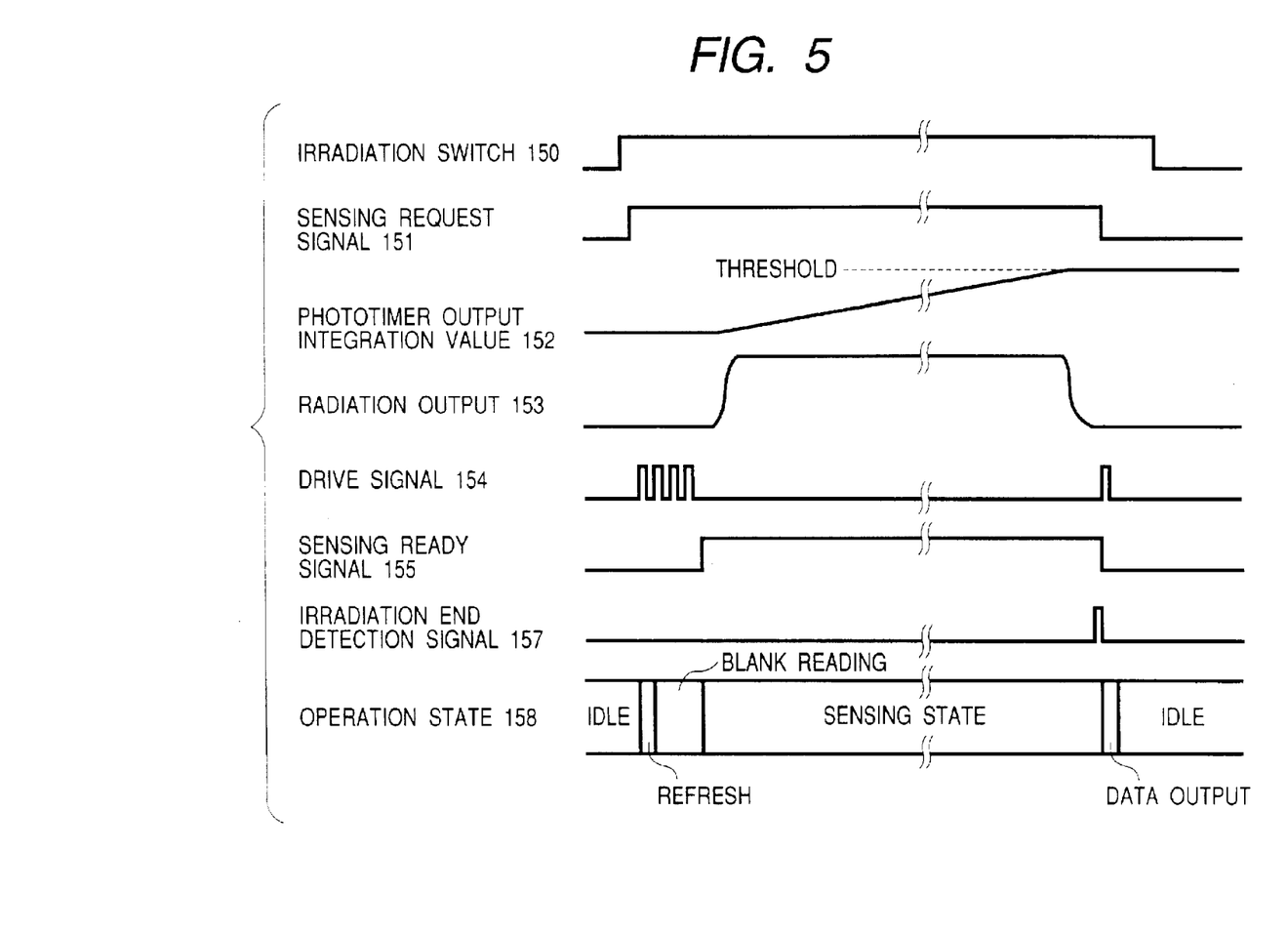
FIG. 5 is a diagram showing synchronous timings in a conventional example.

FIG. 5 is cited from Japanese Patent Application Laid-Open No. 11-151233. Among the numerals 150 through 158 in FIG. 5, 154 denotes a signal by which the drive control unit drives a refresh control circuit RF, and 158 denotes an operation state of the radiation sensing unit 22

Note that an idle in the operation state 158 in FIG. 5 is a state where a refresh operation is periodically executed, a sensing preparation state from performing the refresh operation described above and blank reading up till the radiation is irradiated, a sensing state is a state where a photoelectric converting operation involving the irradiation of radiation described above is conducted, and an image data output-enable state includes the photoelectric converting operation state after finishing the irradiation of radiation and also an image data output-enable state.

The radiation control unit, upon detecting the signal 150 from a radiation irradiation button, transmits a sensing request signal 151 to the drive control unit. The radiation control unit, when receiving the sensing request signal 151, refreshes the radiation sensing unit, and after having a predetermined number of blank reading operations performed, transmits a sensing ready signal 155 to the radiation control unit and at the same time, shifts the radiation sensing unit into a sensing operation.

The radiation control unit, upon detecting the sensing preparation finish signal 155 transmitted from the drive control unit, radiates the radiation from a radiation source. In FIG. 5, the numeral 153 denotes an output state of the radiation irradiated from the radiation source.

The radiation control unit finishes irradiating the radiation when an integration value of outputs from a photo timer for cutting off the X-rays with a proper quantity reaches a threshold value (a predetermined accumulated radiation irradiation quantity) or when a radiation irradiation time preset by the radiation control unit elapses.

Meanwhile, the radiation detection unit monitors the radiation and outputs in realtime an output corresponding to a dose of the irradiated radiation to the radiation irradiation timing judging unit.

The radiation irradiation timing judging unit, when the signal transmitted from the radiation detection unit 23 is less than the predetermined threshold value, judges that the irradiation of radiation is finished, and outputs a radiation irradiation finish detection signal 157 to the drive control unit.

The drive control unit, when receiving the radiation irradiation finish detection signal 157, finishes the sensing operation of the radiation sensing unit and shifts the operation to the image data output-enable state. Herein, the reason for the shift to the image data output-enable state is that the image data is not necessarily required to be output immediately after finishing the irradiation of radiation. It is, however, desirable that the image data be outputted immediately after finishing the irradiation of radiation, considering a decline of S/N ratio of the image output due to accumulation of dark currents.

As explained above, the synchronization between the radiation sensing detector and the X-ray generating device involves an execution of handshaking by a start-stop system irrespective of being wired or wireless.

Japanese Patent Application Laid-Open No. 9-73144 discloses a method of configuring the X-ray detector or photo timer disclosed in Japanese Patent Application Laid-Open No. 11-151233 give above. Specifically, it discloses a radiation detection apparatus for detecting an intensity distribution of radiation being emitted from a radiation source and penetrating an object, which includes a scintillator that emits light corresponding to the intensity distribution of radiation, an optical image detection unit having solid-state photo detection elements disposed two-dimensionally on the front surface of a transparent substrate disposed behind the scintillator, and a light quantity monitor unit disposed in rear of the optical image detection unit, for detecting a quantity of rays penetrating the substrate, of the rays emitted from the scintillator.

Figure 6:
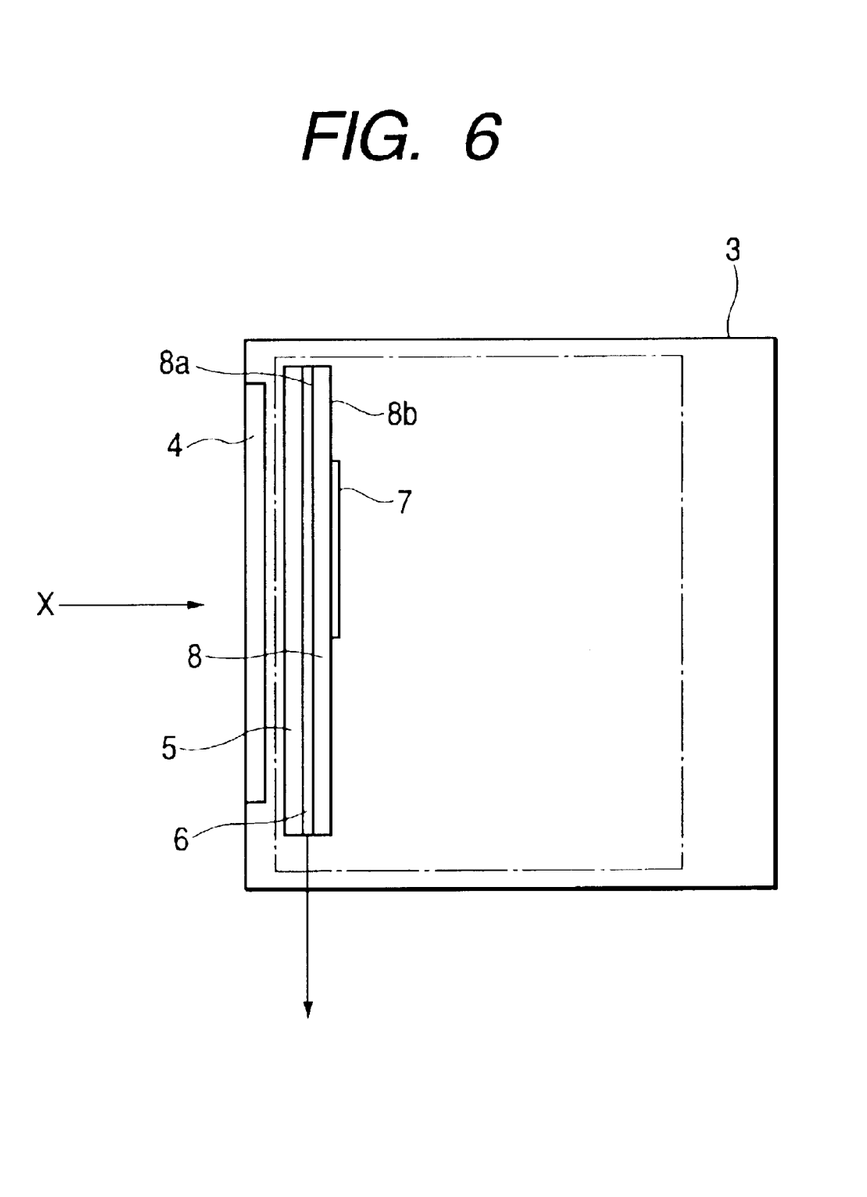
FIG. 6 is a view showing an example of configurations of an X-ray detector and of an X-ray imaging detector in the prior art.

FIG. 6 is a view showing a configuration of a radiation sensing state of the radiation detection apparatus 3 disclosed in Japanese Patent Application Laid-Open No. 9-73144. The X-rays penetrating a grid 4 for reducing scattering reach a scintillator 5.

An optical image detector 6 (a detector for sensing) is bonded to the scintillator 5, and a plurality of solid-state photo detecting elements are formed two-dimensionally on a front surface 8a of a transparent glass substrate 8 by photolithography.

Further, a light quantity monitor unit (that is the X-ray detector or photo timer defined in Japanese Patent Application Laid-Open No. 11-151233) includes the solid-state photo detecting elements formed on a rear surface 8b of the glass substrate 8 by the photolithography, and detects rays penetrating the glass substrate 8 and reaching the rear surface 8b of the glass substrate 8, of the rays which are converted from the radiation X by the scintillator 5.

The conventional examples related to the method of attaining the synchronization between the X-ray apparatus and the sensing detector, and the layout and the configuration of the X-ray detector for attaining the synchronization, have been exemplified so far. Considering a mobile environment for the electronic cassette, however, there arises a problem that the X-ray generating apparatus can not be specified when used.

Namely, the electronic cassette is utilized in combination with a plurality of and plural types of X-ray apparatuses, and the synchronization method can not be specified. In an extreme case, neither a circuit for attaining the synchronization nor terminals might be prepared. Hence, there was needed a technology capable of a radioscopic or sensing process without the start-stop synchronization (handshaking) between the X-ray apparatus and the sensor.

SUMMARY OF THE INVENTION

The present invention aims at enabling a proper radiation sensing process to be executed without establishing a synchronous connection by generating radioscopic and sensing timings.

To accomplish this objective of the present invention, in one aspect of the present invention, a radiation sensing apparatus having a first radiation detection unit and a second radiation detection unit, includes a timing prediction unit which predicts a radiation pulse timing on the basis of a detection value of the first radiation detection unit, and outputting the predicted radiation pulse timing, and a drive control unit which effects drive control of the second radiation detection unit on the basis of an output of the timing prediction unit.

BRIEF DESCRIPTION OF THE DRAWINGS

Other objects and features of the present invention will become apparent in the following discussion in conjunction with the accompanying drawings, in which.

DETAILED DESCRIPTION OF THE PREFERRED EMBODIMENTS

Next, embodiments of a radiation sensing apparatus, a radiation sensing method, a computer program and a computer readable recording medium of the present invention, will be discussed with reference to the accompanying drawings.

In the following discussion, X-rays are exemplified as radioactive rays, however, α-rays, β-rays and γ-rays may also be available.

Figure 1:
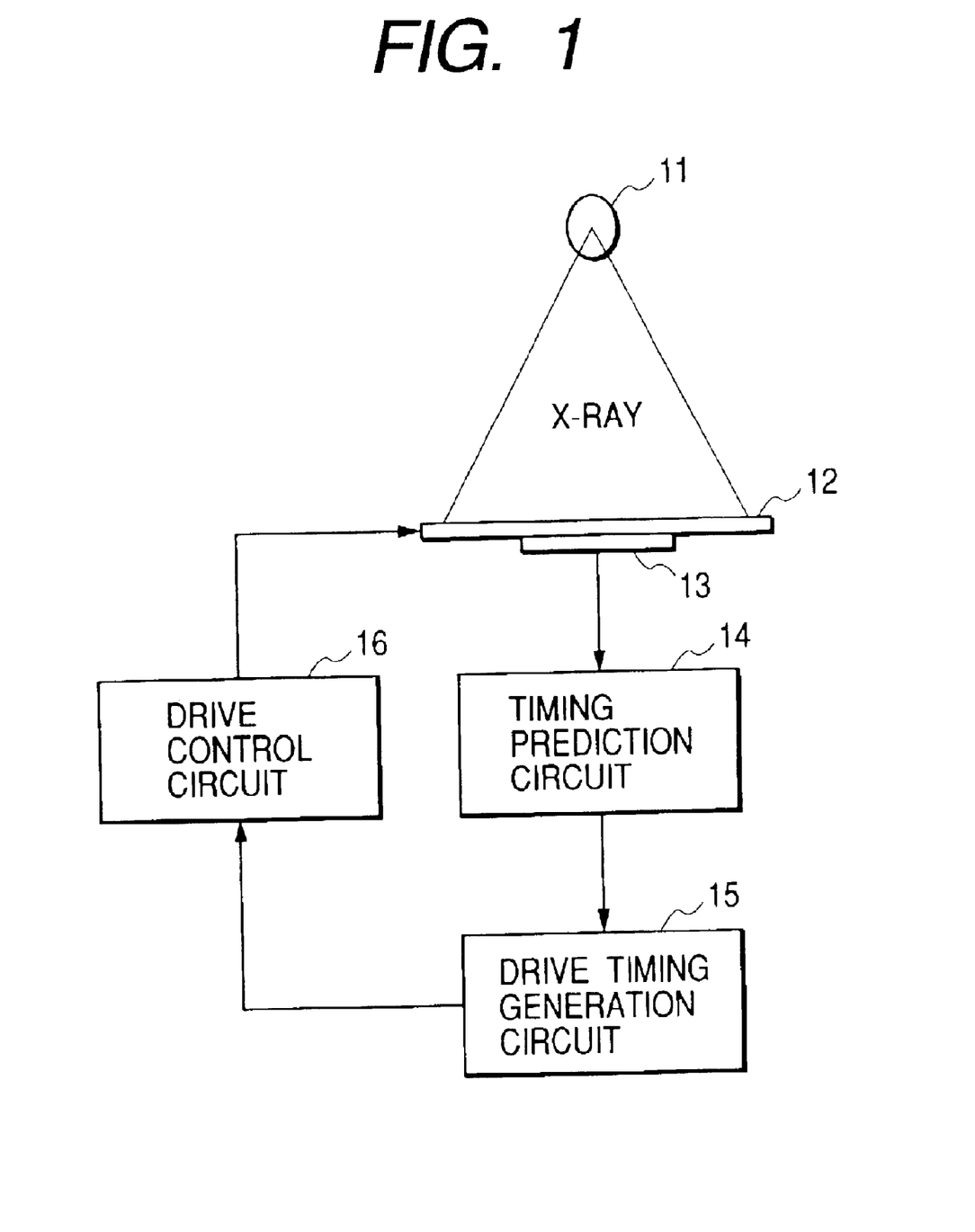
FIG. 1 is a diagram showing a synchronous timing in an embodiment of an electronic cassette according to the present invention.

FIG. 1 shows an example of configuration in the embodiment of the present invention. The X-rays radiated from an X-ray radiation tube 11 penetrate an object (not shown) and reach a second detector 12 (which will hereinafter be termed an X-ray imaging detector), wherein an image is formed. Then, the X-rays penetrating the X-ray imaging detector 12 arrive at a first detector 13 (which will hereinafter be simply called an X-ray detector: the X-ray detector or photo timer defined in Japanese Patent Application Laid-Open No. 11-151233), wherein Start and Stop of the irradiation are detected.

Herein, the X-ray detector 13, as disclosed in Japanese Patent Application Laid-Open No. 9-73144, may be constructed of a detector for detecting visible rays penetrating a glass substrate of the X-ray imaging detector 12 and may be configured in the same plane as the second detector 12 exists by a semiconductor forming process. If configured in the same plane, the X-ray detector 13 is so configured in a stripe shape as to be embedded in between pixels of the second detector 12, so that the X-ray detector 13 is configured of several number of stripe-shaped sensors. A structure of the stripe-shaped sensor is disclosed in detail in Japanese Patent Application No. 2002-56127. Further, the X-ray detector 13 may be constructed of one channel or may also be constructed of a plurality of detectors such as three channels, etc. If constructed of the plurality of detectors, the channel to be used can be automatically selected correspondingly to a capturing body part input unit (not shown).

When an operator arrives at a sickroom of a patient or when an installation of an electronic cassette for a capturing body part of the patient is completed, there comes into a sensing preparation state and the X-ray detector 13 is supplied with the electric power to start its drive.

Figure 2:
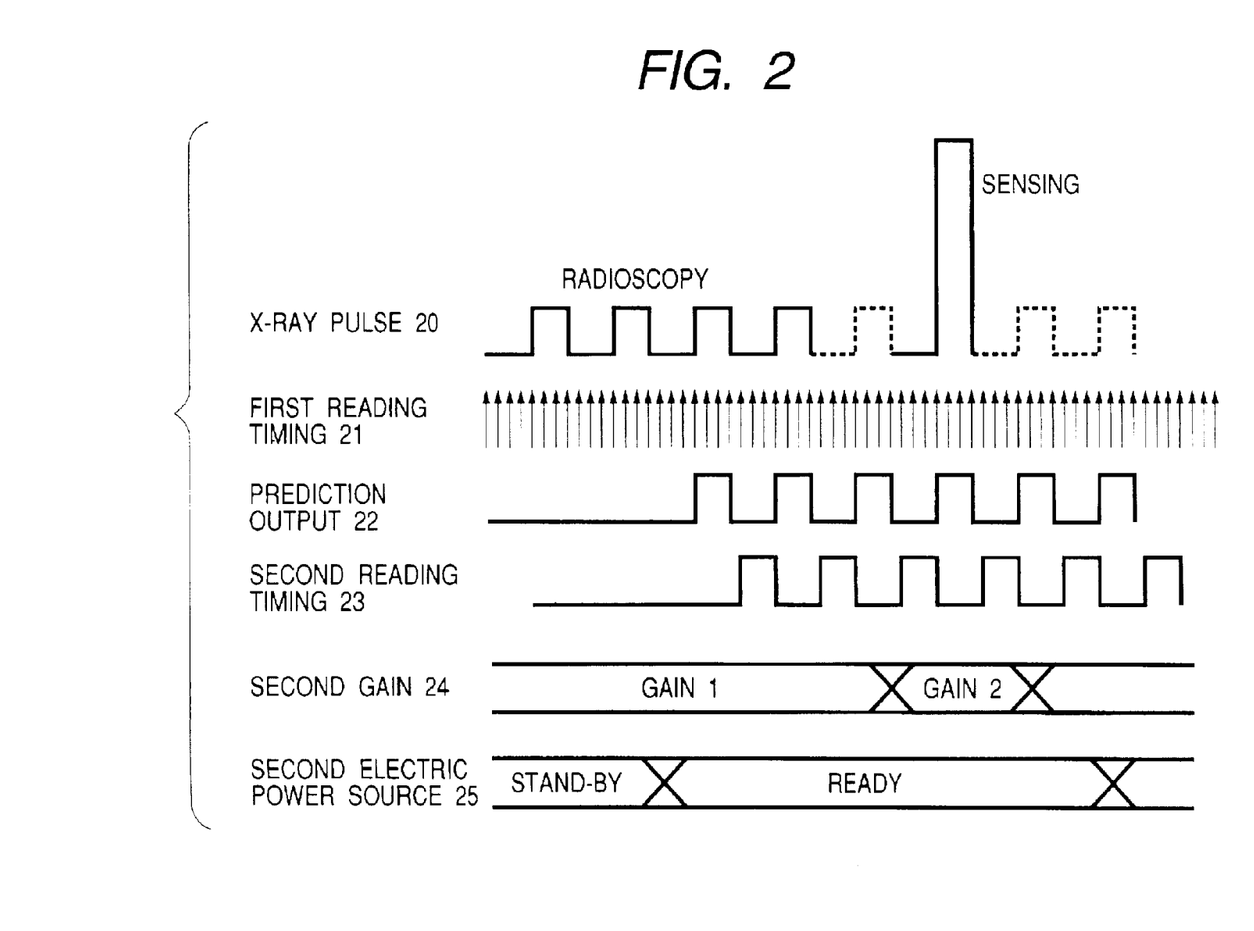
FIG. 2 is an explanatory diagram showing operation timings of respective units in the embodiment.

FIG. 2 is an explanatory diagram of operation timings of the respective units in FIG. 1, wherein among the numerals 20 through 25, the numeral 20 denotes an X-ray pulse, 21 is a first reading timing, 22 is a prediction output, 23, a second reading timing, 24 is a second gain, and 25 is a timing of a second electric power source. In the first reading timing 21 in FIG. 2, a timing when the data is captured subsequently to a start of the drive is indicated by an arrowhead of the first reading timing.

Medical checkup imaging techniques for the patient can be categorized into fluoroscopy and radiography. The fluoroscopy is utilized for observing dynamic images with a small amount of dose, and is used for positioning the patient before radiography and for a dynamic observation of the patient. On the other hand, radiography is taken with a comparatively large amount of dose, wherein the pixels are collected in a fine resolution mode.

FIG. 2 shows an example in which a radiography is performed after a fluoroscopy process, however, in some cases only the fluoroscopy is performed. An arrangement of the first embodiment is not applicable to a single exposure of X-rays for the radiography without performing the fluoroscopy. Generally, a dose that is approximately one-hundredth the dose for a radiography, may suffice for a fluoroscopy. According to the first embodiment, with approximately two or three exposures of the pulse X-rays for the fluoroscopy, it is possible to attain the synchronization. Accordingly, even when executing the pulse X-ray exposures for the radioscopic process before the sensing process, this is merely an increase by several percents in exposure dose. Hence, the exposure is within a level low enough not to cause a problem.

In the example shown in FIG. 2, when the X-ray pulse exposure for the fluoroscopy is started, the X-ray detector 13 can detect the exposure. Namely, a drive period of the X-ray detector 13 undergoes sampling at a period well faster than a pulse interval of the X-rays, and hence, if a period and a waveform of the exposure X-ray pulse are substantially the same, a next x-ray pulse timing can be predicted.

In the example shown in FIG. 2, a third exposure pulse is predicted from the exposure pulses up the second time, and thereafter the predictions are made in sequence, thereby obtaining prediction output results. To make the prediction output precise, supposing that the X-ray pulse is on the order of 1 ms, it is desirable that the drive period of the X-ray detector 13 be on the order of 1 $\mu$s, however, the drive (sampling) may be effected at a frequency that is at least twice an input pulse frequency.

An architecture of a circuit for predicting the X-ray pulse, i.e., a timing prediction circuit 14 is that an ON-time and an OFF-time of the sampled X-ray pulse waveform are calculated and may be then copied. It is considered that an enhancement of the prediction accuracy may be attained by making the prediction in such a manner that an average of the pulse ON-time and OFF-time which are sequentially measured is operated or a weighted average thereof is calculated with making heavier a weight on each of the recent ON- and OFF-times.

Based on the prediction output results from the timing prediction circuit 14, a drive timing generation circuit 15 generates a drive timing of the X-ray imaging detector 12. The drive timing of the X-ray imaging detector 12 in FIG. 2 indicates, for an illustrative convenience, a reading timing of data, and an integration time of the X-ray imaging detector 12 is determined by this reading timing.

The drive timing generation circuit 15 may set an exposure interval as an integration time and other intervals as reading intervals. Further, when scheming to form a prediction pulse, a phase can be also changed (progressed) in consideration of a delay time due to a sampling resolution.

Referring again to FIG. 2, the integration is conducted at such a timing that the exposure of the X-ray pulse is predicted, and the reading is conducted for such a period that no exposure of the X-ray pulse is predicted. The reading time denoted by 23 in FIG. 2 is determined by the number of sensors, an AD conversion period and the number of AD converters, but is designed to meet this value of 30 pulses/sec since the period of the fluoroscopy X-ray pulse is generally 30 pulses/sec.

The X-ray imaging detector 12 is driven in the manner described above, and an X-ray fluoroscopy image is captured. Next, a shift timing from the fluoroscopic process to the radiography process is disclosed. The shift from the radioscopic process to the radiography process requires a consent beforehand. A time is needed for shifting from an X-ray pulse mode using a general X-ray apparatus to a pulse mode in which a large dose for the sensing process is emitted. In the present embodiment, it is assumed that the shift time is of 2 pulses and a rule exists between the X-ray apparatus and the electronic cassette.

As for the X-ray pulses shown in FIG. 2, a fifth pulse which is drawn by a broken line implies that the exposure of the X-ray pulse is not effected. This blank pulse is detected by the timing prediction circuit 14 through an output of the X-ray detector 13, thereby predicting switching-over to the sensing mode. Based on this prediction result, a drive control circuit 16 switches over a gain of the X-ray imaging detector 12.

Generally, the shift from the fluoroscopic process to the radiographic process involves setting the gain to one-twentieth from one-tenth. After the X-ray pulse for the sensing process, there is a shift to the normal pulse fluoroscopic process, and hence the gain is returned to the fluoroscopic level after the X-ray pulse for the radiographic process.

In the discussion made so far, the drive timing of the X-ray imaging detector 12 through the prediction circuit is exemplified. However, the timing prediction circuit 14 can control an electric power source mode of the X-ray sensing apparatus. A standby state shown in FIG. 2 can be conceived as a state where an electricity consumption of the X-ray sensing apparatus is small. Viewing based on the power source of the X-ray sensing apparatus, the components of the arrangement can be divided into a sensor portion and a reading circuit portion. The small electricity consumption state means that at least the power source of the reading circuit portion remains OFF.

The reason for switching OFF the power source of the reading circuit portion is that an amplifier of the reading circuit portion generally has a large electricity consumption. Similarly, the sensor portion can be switched OFF. However, it is considered that there may be some sensors of the sensor portion do not become stable immediately after switching ON the power source. In this case, it is therefore desirable that the power source of the sensor portion of the X-ray sensing apparatus are switched ON simultaneously when switching ON the X-ray detector 13. Then, a state where both of the sensor portion and the reading circuit portion are kept ON, is defined as a ready state. After the X-ray detector 13 detects the X-ray pulse, the X-ray imaging detector 12 is shifted to the ready state.

Other Embodiments

The present invention may be applied to a system constructed of a plurality of devices and to an apparatus constructed of one single device.

Further, the present invention includes an aspect, wherein software program codes for realizing the functions in the embodiment disclosed above are loaded from a storage medium through a transmission medium such as the Internet, etc. into an apparatus connected the variety of devices or into a computer in the system so as to operate the variety of devices in order to realize the functions in the embodiment discussed above, and the variety of devices are operated in accordance with the program stored on the computer (a CPU or an MPU) of the system or of the apparatus, thereby exercising the present invention.

Moreover, in this case, the software program codes themselves realizes the functions in the embodiment discussed above, and the program codes themselves and a means for loading the program codes into the computer, e.g., the storage medium stored with these program codes, configure the present invention. The storage medium stored with the program codes may involve the use of, for example, a flexible disk, a hard disk, an optical disk, magneto-optic disk, a CD-ROM, a magnetic tape, a nonvolatile memory card, a ROM and so on.

Further, the embodiment of the present invention, as a matter of course, includes the program codes in the case of realizing the functions explained in the embodiment disclosed above by executing the program codes loaded into the computer and further in the case of realizing the functions exemplified in the embodiment disclosed above in cooperation with OS (Operating System) or other application software by which the program codes run on the computer.

Moreover, the present invention includes a case where after the program codes loaded are stored on a memory provided in a function extended board of the computer or in a function extended unit connected to the computer, a CPU, etc. provided in the function extended board or in the function extended unit executes a part or the whole of the actual processes on the basis of instructions of the program codes, and the functions in the embodiment discussed above are realized by the processing thereof.

As explained above, the prediction of the radiation pulse timing enables the radioscopic and sensing timings of the image sensor to be surely generated and the proper viewing (sensing) to be attained without establishing the wired or wireless online synchronous connection.

Further, with the radiation detector that is small in the electricity consumption remaining ON, and the power source/reading mode of the radiation sensing detector that is larger in the electricity consumption is controlled based on the output result of this radiation detector. This makes it possible to reduce both the consumption of the battery and generation of an unnecessary heat.

Many widely different embodiments of the present invention may be constructed without departing from the spirit and scope of the present invention. It should be understood that the present invention is not limited to the specific embodiments described in the specification, except as defined in the appended claims.

What is claimed is:

1. A radiation sensing apparatus comprising:
an x-ray radiation tube for emitting a radiation at a predetermined time period;
a first radiation detection unit for detecting radiation amount of the radiation;
a second radiation detection unit for converting the radiation into image data;
a timing prediction unit for calculating the time period on the basis of a detection value of said first radiation detection unit; and
a drive control unit for effecting drive control of said second radiation detection unit,
wherein said drive control unit effects the drive control of said second radiation detection unit in a cycle which corresponds to the time period calculated by said timing prediction unit.

2. A radiation sensing apparatus according to claim 1, wherein said first radiation detection unit collects data at a frequency measurement period that is equal to or larger than twice the time period of radiation irradiated.

3. A radiation sensing apparatus according to claim 1, wherein said drive control unit switches over a reading mode of said second radiation detection unit on the basis of a prediction output of said timing prediction unit.

4. A radiation sensing apparatus according to claim 3, wherein the reading mode switched over by said drive control unit is a gain of said second radiation detection unit.

5. A radiation sensing apparatus according to claim 3, wherein the reading mode switched over by said drive control unit is a standby state or a ready state of said second radiation detection unit.

6. A radiation sensing apparatus according to claim 5, wherein said drive control unit keeps said second radiation detection unit in the standby state till said first radiation detection units detects the radiation, and switches over said second radiation detection unit to the ready state after said first radiation detection unit detects the radiation.

7. A radiation sensing apparatus according to claim 1, wherein said first radiation detection unit is a visible sensor for detecting a visible ray penetrating a substrate of said second radiation detection unit.

8. A radiation sensing apparatus according to claim 1, wherein said first radiation detection unit is a radiation sensor for detecting a visible ray penetrating a substrate of said second radiation detection unit.

9. A radiation sensing method using a radiation sensing apparatus having a first radiation detection unit and a second radiation detection unit, comprising:

a detection step of detecting radiation amount of a radiation at a predetermined time period using said first radiation detection unit;

a timing prediction step of calculating a radiation period of the radiation on the basis of a detection value in said first radiation detection step; and a drive control step of effecting drive control of said second radiation detection unit, wherein said drive control step effects the drive control of said second radiation detection unit in a cycle which corresponds to the radiation period calculated in said timing prediction step.

10. A program for making a computer execute a radiation sensing method using a radiation sensing apparatus having a first radiation detection unit and a second radiation detection unit, said program making said computer execute:

a detection step of detecting radiation amount of a radiation at a predetermined time period using said first radiation detection unit;

a timing prediction step of calculating a radiation pulse period of the radiation on the basis of a detection value in said first radiation detection step; and a drive control step of effecting drive control of said second radiation detection unit, wherein said drive control step effects the drive control of said second radiation detection unit in a cycle which corresponds to the radiation period calculated in said timing prediction step.

11. A computer readable recording medium which records thereon a computer program according to claim 10.

12. A radiation sensing apparatus having a first radiation detection unit and a second radiation detection unit, comprising:

a timing prediction unit which predicts a radiation pulse timing on the basis of a detection value of said first radiation detection unit, and outputting the predicted radiation pulse timing, and a drive control unit which effects drive control of said second radiation detection unit on the basis of an output of said timing prediction unit, wherein said first radiation detection unit is a sensor formed in said same plane as said second radiation detection unit and between pixels of said second radiation detection unit.

* * * * *

UNITED STATES PATENT AND TRADEMARK OFFICE
CERTIFICATE OF CORRECTION

PATENT NO. : 6,891,923 B2
DATED : May 10, 2005
INVENTOR(S) : Tsujii

It is certified that error appears in the above-identified patent and that said Letters Patent is hereby corrected as shown below:

Column 1,
Lines 33 and 34, change "on a CRT, etc.. ." to -- on a CRT, etc. --;

Column 2,
Line 26, change "DC/Dc" to -- DC/DC --;
Line 49, change "unit 22" to -- unit. --; and Column 10,
Line 1, delete the word "pulse".

Signed and Sealed this

Thirteenth Day of September, 2005

JON W. DUDAS
*Director of the United States Patent and Trademark Office*